(12) United States Patent
Kanevsky et al.

(10) Patent No.: US 6,480,861 B1
(45) Date of Patent: Nov. 12, 2002

(54) DISTRIBUTED ADAPTIVE COMPUTING

(75) Inventors: Paul Kanevsky, Lawrenceville; Anthony C. Pizi, Cranbury; Thomas Tsao, Princeton Junction; Daniel Tyler, Lambertville, all of NJ (US)

(73) Assignee: Merrill Lynch, Co., Inc, New York, NY (US)

( * ) Notice: Subject to any disclaimer, the term of this patent is extended or adjusted under 35 U.S.C. 154(b) by 0 days.

(21) Appl. No.: 09/258,711

(22) Filed: Feb. 26, 1999

(51) Int. Cl.[7] .............................................. G06F 17/30
(52) U.S. Cl. ........................ 707/103; 707/10; 705/80; 705/400; 709/202
(58) Field of Search ........................ 707/10, 104, 103; 705/70, 79, 80, 10, 34, 35, 400; 709/229, 203, 217, 202

(56) References Cited

U.S. PATENT DOCUMENTS

| | | | | | |
|---|---|---|---|---|---|
| 5,940,815 A | * | 8/1999 | Maeda et al. | .................. | 706/12 |
| 6,049,819 A | * | 4/2000 | Buckle et al. | ............... | 709/202 |
| 6,078,906 A | * | 6/2000 | Huberman | .................... | 705/37 |
| 6,084,874 A | * | 7/2000 | Nyguyen et al. | ............ | 370/352 |
| 6,115,712 A | * | 9/2000 | Isam et al. | ..................... | 707/10 |
| 6,167,449 A | * | 12/2000 | Arnold et al. | ............... | 709/227 |
| 6,178,406 B1 | * | 1/2001 | Cheetham et al. | ............. | 705/10 |
| 6,222,916 B1 | * | 4/2001 | Cameron et al. | ...... | 379/207.03 |

* cited by examiner

*Primary Examiner*—Greta L. Robinson
(74) *Attorney, Agent, or Firm*—Morgan, Lewis & Bockius, LLP (57) ABSTRACT

A system and a method for managing, organizing, and allocating service providers in the operational environment of a distributed computer network by applying trade and price mechanisms to a plurality of resource allocation decisions. Local resource allocation rules are set forth for maintaining a near-optimal, global load distribution. The service providers are dynamically allocated based upon the supply of the providers and the demand thereof. An automated mechanism, based on service provider reputation, channels demand away from failing or broken service providers. Strategic load balancing rules cause the elimination of ineffective service providers, and also provide a dynamic replication of service providers that cannot handle the current demand. Further, a method for managing the overall system behavior utilizes administrative surcharges.

31 Claims, 6 Drawing Sheets

DISTRIBUTED ADAPTIVE COMPUTING

FIELD OF THE INVENTION

The present invention relates generally to computerized information systems. More specifically, it describes sophisticated techniques for managing, locating, allocating and assuring the availability of information resources in a distributed environment.

BACKGROUND OF THE INVENTION

Distributed applications are much more difficult to write and manage than applications developed for a single computer. The basic problem facing distributed application designers is not a lack of resources but an inability to dynamically manage and effectively leverage those resources. Efficiently utilizing a multiplicity of resources often becomes a prohibitively complex problem.

The availability of an application on demand is of critical importance in many operational environments. In a distributed environment, it is possible to enhance the availability and fault-tolerance of an application by providing redundant points of service in order to ensure that the failure of any individual part of the network does not prevent the network, as a whole, from delivering critical services. However, the introduction of redundant points of service raises a set of secondary issues that are addressed by distributed application designers. First, one must consider the manner in which the application leverages redundant resources so as to decrease the response time of a given service provider when this provider is under load. One must also consider the number of service points which will be sufficient to accommodate demand, as well as the physical locations at which these service points should be located.

Many prior art approaches make no attempt whatsoever to leverage redundant resources so as to decrease the response time of a given service provider under load. Instead, alternate service instances of a given resource are held in reserve and exist solely to provide fault-tolerant service provision. The primary advantage of this simplistic approach is that the backup instances of service have predictable levels of performance. However, this method is inefficient. Redundant resources which are idle are maintained and upgraded, but bring no benefit other than increasing the odds that a service can tolerate the failure of a given service provider.

Other prior art techniques do provide for the leverage of resources. One example of such a technique is known as "early binding". Service requestors are statically assigned instances of service provision, which is advantages in that requests for service are spread across multiple instances of a given service provider. Service requests are then assigned to a specific instance of a service provider before invocation. Since requestors are "early-bound" to service provision, the method does not require the performance of successive iterations in an attempt to locate a suitable service provider. However, a major shortcoming of the "early binding" approach stems from the static binding that occurs between a request for service and the service provider. This method is not able to adjust to any shifts in the population or state of service providers. A failure in an individual instance of a service provider denies access of that service to the population of requestors it services. Moreover, the allocation of requests cannot respond to varying loads. If a community of service requestors is very active, the system does not spread the demands across all available providers. Only those providers statically bound to the requestors are used to process the workload created by the incoming requests.

Another existing technique for leveraging redundant resources is termed "late binding". Service requestors are dynamically assigned to a given instance of a given service provider. The dynamic assignment of a service request to a service provider requires that the system decide which candidate service provider should process a given request. This decision is made by employing any of three strategies:

(i) Round Robin: incoming service requests are assigned to a list of candidate service providers by a dispatching entity. Selection of candidates is determined by the order of the candidates on the list. Each service provider receives a service request in turn.

(ii) Random Binding: similar to the Round Robin method, except that the list of candidate service providers has no particular order. Assignment of service provisions is drawn from the list of candidates at random.

(iii) Policy Driven: the dispatching entity examines incoming service requests and applies a set of policies that influence the dynamic assignment of requests to service providers.

The Round Robin and Random Binding strategies make the assignment of service requests to service providers using a blind algorithm. They do not take into consideration the demand or load on system resources. Policy-driven algorithms distribute service requests based on a set of rules. The system reports a set of "metrics" to a rule engine. The rule engine uses these metrics to make decisions regarding the allocation of system resources to satisfy service requests.

The problem with policy-based algorithms is that they create bottlenecks in the dispatching entity. The overhead associated with the gathering of data and the interpretation of that data is often intensely resource consuming. More importantly, because service providers require different sets of resources from different locations and in different ratios, the policies created for one class of service provision are not applicable to other service providers. Taken together, these factors result in a direct relationship between the complexity of the dispatching entity and the number of services being managed.

Prior art techniques have also been developed to determine the quantity of service points which are sufficient to accommodate demand. Distributed applications attempt to spread requests for service across a population of candidate service providers. In its simplest form, the response time for a provision of service ought to decrease as the population of service providers increases. Distributed application architects take a specification of maximum acceptable response time and an estimation of projected load, and then commission resources to meet that demand. They guess at the amount of resources they should assign to a given problem, and tune this estimate over time through observation.

The task of estimating and refining resource allocation estimates and bringing additional resources on-line (or off-line) is labor intensive. Moreover, each time the demand, resource, or priority profiles of a network change, the allocation of resources should be adjusted. The man-hours required to dynamically tune resources allocation in a distributed environment are prohibitive.

Pursuant to one common prior art approach, the management of access to system resources in a distributed environment may be conducted by ascertaining the rights and privileges of a service requestor at the time that a service request is received. If a requestor's privileges are sufficient to allow execution of the request for service provision, the request proceeds. Requestors with insufficient privileges are not granted access to a service. Using this approach, access to a system resource is binary: based upon the identity of the service provider, the request is either granted or not granted. Access privileges to system resources are typically defined and assigned by an administrator. The administrator grants these privileges to requesting entities in an effort to anticipate access requirements in advance of actual service requests. While this method of access control is well-suited to the provision of system security, it is deficient when applied to resource allocation. The assignment of privileges to regulate access to resources is essentially an effort to early-bind the set of resources to a service requestor. Such an assignment shares the same set of design deficits as the early binding technique described above.

As a consequence of the limitations of the foregoing resource allocation techniques, it has become common practice to:

(i) Allocate resources to satisfy hypothetical peak demands, thereby guaranteeing that, for those times that the system is not operating at peak demand, a portion of the allocated resources are idle;

(ii) Postpone efforts to improve slow service provider response times. Often, the response times can be decreased by the reallocation of resources. However, because organizations lack the man-hours to actually configure the population of service providers, this work is typically postponed until time permits; and/or (iii) Dedicate network resources to performing a specific task. This leads to inefficient resources allocation under anything but the expected load conditions. In addition, this causes even more network resources to remain idle under normal load.

Other prior art approaches have dealt with selecting appropriate physical locations for applications on a network so as to enhance system performance. The physical location of an application on a network directly impacts the response time of that application. Services installed on under-utilized resources execute faster than identical services installed on busy resources. The topological proximity of a service to its potential requestors and the proximity of system resources necessary for the delivery of that service directly affect the response time of that service. Ideally, the decision of where an instance of a service ought to be installed takes into account the location of the community of service requestors, available bandwidth, the proximity of data and third party services, and the load on the server where the services run. At present, this decision is typically made by system administrators and is adjusted as new applications, resources and demands are made of the system. Unfortunately, as in the case of resource allocation, decisions pertaining to resource location are also labor-intensive and subject to similar constraints. However, the locations of system resources, service providers, and service points are not readily changeable so as to provide for optimization under a variety of conditions. This is compounded by the difficulty associated with gathering statistics and measures to determine if the location of a service is inefficient and if so, where to relocate the service in order to maximize efficiency.

SUMMARY OF THE INVENTION

In view of the deficiencies of the prior art, it is an object of the invention to provide a dynamic mechanism for managing, organizing, and allocating service providers in the operational environment of a computer network.

It is a further object of the invention to apply market economic methods to the management, organization, and allocation of service providers.

It is a still further object of the invention to apply trade and price mechanisms to a plurality of local resource allocation decisions, and to merge these decisions into resource allocation rules which efficiently manage service provider usage in large computer networks.

It is another object of the invention to dynamically allocate service providers based upon the supply of the providers and the demand thereof.

It is moreover another object of the invention to utilize only locally available information to perform global optimization of service provision.

It is yet another object of the invention to provide a real-time service provider allocation scheme that adaptively responds to ever-changing system conditions.

It is a further object of this invention to permit system administrators to influence the utilization of selected service providers through the use of price surcharges.

In accordance with the objects of the invention, one or more service providers are allocated according to the relative priorities of processes which request the use of a respective service provider. A service provider may refer to a database, a computer program, a person providing services over a computer network, an information resource, or a hardware resource such as a fax machine, a printer, or a data storage drive. A process refers to the manner in which any entity that can request the allocation of a service provider will use that service if it is, indeed, allocated to that entity. A service requestor refers to an entity that may require the use of one or more service providers. Illustrative service requestors include computer programs as well as devices coupled to the computer network for use by individuals requesting services.

A plurality of service providers, a plurality of service requestors, and a service broker are all accessible from a computer network. The service broker uses a service provider allocation directory to allocate service providers to service requestors based upon dynamically-changing pricing constraints.

The service provider allocation directory associates each of a plurality of service providers with a set of representative indicators. A first indicator identifies a type or class description of the service provider. A second indicator specifies the location of the service provider on the computer network. A third indicator specifies the base price from the service provider which includes the cost of underlying services. The service provider allocation directory may also utilize one or more of the following optional indicators. For instance, the service provider may provide one or more attribute prices, which are all entered into the service provider allocation directory as a fourth indicator. The attribute prices specify the price differential for different levels of service or options that the service provider has available. A fifth indicator may specify the load premium as provided by the execution manager. The load premium reflects the demand on a given service provider by the service requestors. Increased demand causes the premium to increase. Decreased demand causes the premium to gradually decrease. A sixth indicator may specify the reputation premium as provided by the execution manager. The reputation premium is used as an adjustment to direct requests away from service providers that have a history of failure or not fulfilling service requests. Each failure to complete a request causes a proportional increase in the reputation premium. A seventh indicator may represent an administrative premium which can be utilized by the system administrator to influence system usage to or away from a service provider.

Service requestors issue service requests over the computer network. The service request includes the type or class of service desired, as well as a budget specifying the maximum price that the service requestor will pay for that service. Service requests are allotted request budgets which are representative of the relative value the users of the invention place on the timely execution of a service request. Higher request budgets allow the service requestor to purchase higher execution priority from a service provider, thereby providing a more timely execution of the service request. Moreover, the service requestor will allocate a higher percentage of its total budget to individual service requests having higher business value. In this fashion, service requests with high business value, as expressed by their budget, gain prioritized access to the invention's resources.

Service providers send availability messages to the service broker indicating the availability of one or more services. These messages identify the type or class of service, the location of the service, and associate each service with a base price and attribute prices. The broker stores these availability messages in the service provider allocation directory. The execution manager sends execution premium messages to the service broker indicating new, updated values for the reputation and load premiums. The broker stores the execution premiums in the service provider allocation directory.

In response to the receipt of a service request, the service broker uses the indicators in the service provider allocation directory to generate a trial candidate list of service providers. This trial candidate list includes only service providers of the type or class desired by the service requestor. The service broker then calculates a levied price for each of a plurality of service providers on the trial candidate list. The levied price is the summation of the base price, requested attribute price, load premium, reputation premium, administrative premium and a delivery premium that is determined based on the relative locations of the service requestor and the service provider.

The service broker eliminates any service providers on the trial candidate list that do not have a levied price below the budget specified in the service request, thus providing a final candidate list. The service broker then generates a draft contract for each service provider on the final candidate list. The draft contract specifies the identity of the service provider, the location of this service provider on the computer network, the identity of the service requestor, the location of the service requestor on the computer network, the levied price, the base price, the attribute price, the load premium, the reputation premium, the administrative premium, the delivery premium, the type or class of service, an optional schedule for performance of the service, and an optional contract expiration date and time.

In response to the receipt of one or more draft contracts, the service requestor may choose to redeem any of these draft contracts through the use of an execution manager software component accessible from the computer network. However, it is usually the lowest-priced draft contract that is redeemed. The execution manager directs the execution of a service request contract, and instructs the accounting manager to collect the funds from the service requestor to make payments to the service provider. Every service provider and service requestor in the system has an associated account that describes the funds at the service provider or service requestor's disposal. These funds are used as a medium of exchange between service provider and service requestor. Upon the successful delivery of service the accounting manager extracts funds from the service requestor account and moves them to the service provider account in the amount of the sum of the base price, the attribute price and the load premium specified in the redeemed contract. In this manner the account associated with the service provider gains funds.

Service providers are also charged rent. Rent is defined as a periodic charge against a service provider account. The rent is determined by the summation of all levied prices for all software and hardware components needed to actively maintain the service provider, even while it remains idle. In this manner, the rent and therefore the account level, are directly related to the speed, capacity and demands associated with the physical hardware, for example, memory, disk storage, and CPU utilization. In this manner, the account associated with a service provider loses funds.

The invention will install additional copies of a service provider on the network when at least one of the following administratively defined thresholds has been surpassed: (1) the account associated with a service provider which provides a record of the successful delivery of service over time; (2) the reputation premium associated with a service provider which provides a measure of the service providers ability to deliver service; (3) the load premium which is a measure of current demand on a service provider. The invention will split the funds associated with the original service provider account between the original service provider and the newly created copy. When a service provider account shrinks past an administratively defined threshold, due to payment of rent and a lack of demand, the service is deemed bankrupt and the service provider is erased from the service provider allocation directory and removed from the network.

Pursuant to a preferred embodiment of the invention, the levied price charged by each service provider is dynamically adjusted over time in accordance with a set of adjustment rules. According to a first rule, as the demand for a particular service provider increases, its levied price also increases. The levied price of a service provider that is idle for too long will be decreased until sufficient demand for the resource is generated. Finally, a given service provider should generate sufficient demand or risk "bankruptcy", meaning that the service provider is removed from the allocation directory. Accordingly, supply and demand are the main driving forces responsible for lowering or increasing levied prices. Profits or losses determine the continued existence of a given service provider or its removal from the service provider allocation directory.

Pursuant to a further embodiment of the invention, strategic load balancing rules are applied to each service provider to dynamically de-install an ineffective service provider, and to dynamically replicate service providers that cannot handle all of the current demand from service requestors. These load balancing rules, as well as any rules used to determine levied prices, need only utilize information that is locally available on the computer network. Such rules need not be based upon global knowledge of the state of the entire computer network. In this manner, the levied prices computed by the service broker, in combination with strategic load balancing, produce a globally adaptive, self-configurable behavior for a plurality of service providers.

DETAILED DESCRIPTION OF THE PREFERRED EMBODIMENTS

Figure 1:
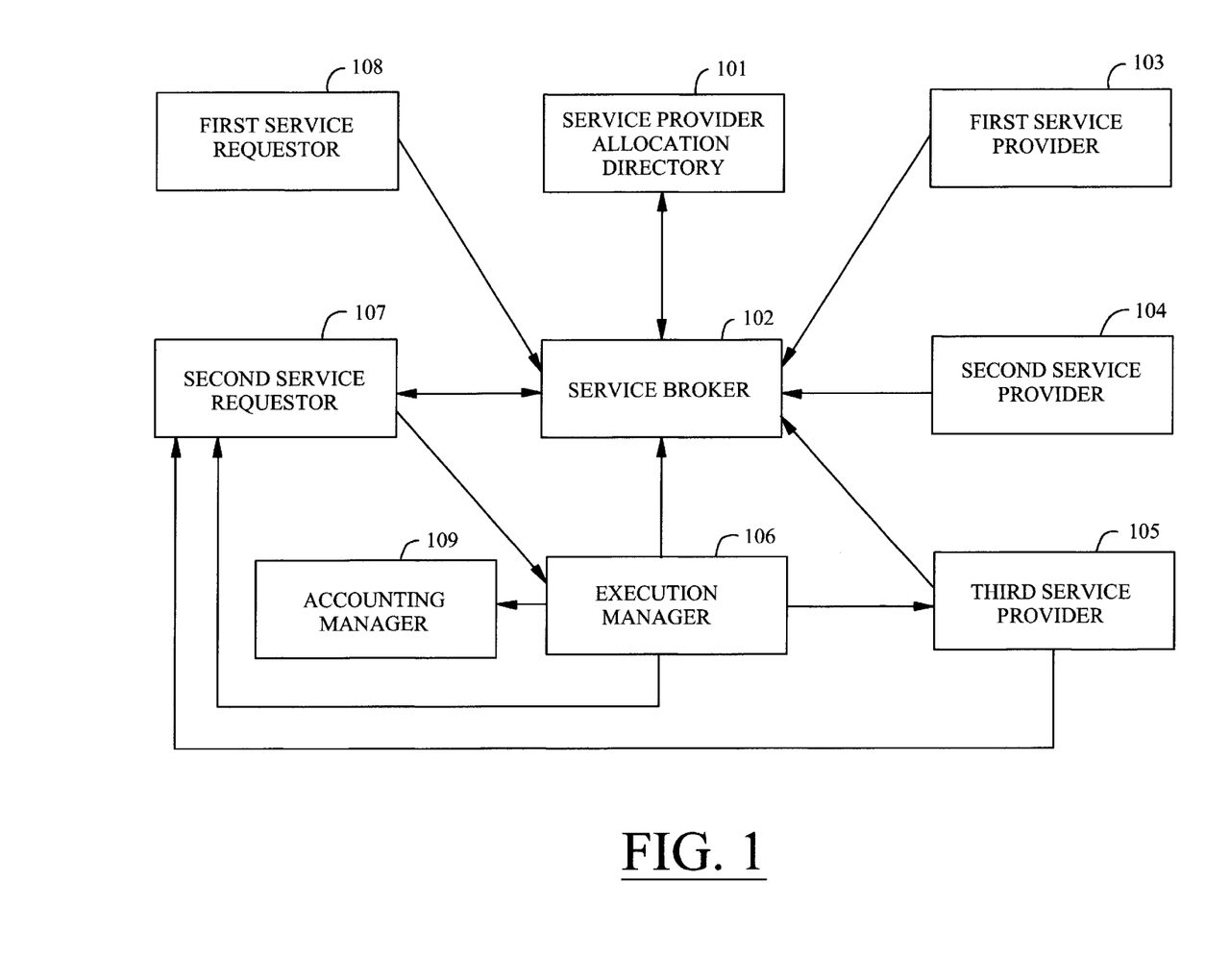
FIG. 1 is a hardware block diagram showing an illustrative operational environment for the present invention.

Refer to FIG. 1, which is a hardware block diagram showing an illustrative operational environment for the present invention. In accordance with the objects of the invention, one or more service providers, such as first service provider 103, second service provider 104, and third service provider 105, are allocated according to the relative priorities of processes which request the use of a respective service provider. First service provider 103 may represent a database, a computer program, a person providing services over a computer network, an information resource, or a hardware resource such as a fax machine, a printer, or a data storage drive. Second service provider 104 and third service provider 105 may represent databases, computer programs, people providing services over a computer network, information resources, or hardware resources such as fax machines, printers, or data storage drives. Although FIG. 1 shows three service providers, this is for purposes of illustrations, as a greater or lesser number of service providers also falls within the scope of the invention. In the context of allocating first, second, and third service providers 103, 104, 105, a process refers to the manner in which any entity that can request the allocation of a service provider will use that service if it is, indeed, allocated to that entity.

First service requestor 108 and second service requestor 107 each represent any entity that may require the use of one or more service providers. Illustrative service requestors include computer programs as well as devices coupled to the computer network for use by individuals requesting services. Although the configuration of FIG. 1 shows two service requestors, it is to be understood that a greater or lesser number of service requestors could be employed.

First, second, and third service providers 103, 104, 105, first and second service requestors 108, 107, and a service broker 102 are all accessible from a computer network. Service broker 102 is a software construct that uses a service provider allocation directory 101 to allocate service providers 103, 104, 105 to service requestors 108, 107 based upon dynamically-changing pricing constraints. The service provider allocation directory 101 associates each of a plurality of service providers 103, 104, 105 with a first indicator specifying a type or class of service provider, a second indicator specifying the location of the service provider on the computer network, a third indicator specifying the base price for the service, an optional fourth indicator specifying attribute pricing, an optional fifth indicator specifying the load premium, an optional sixth indicator specifying the reputation premium, and an optional seventh indicator specifying administrative premiums.

Figure 2:
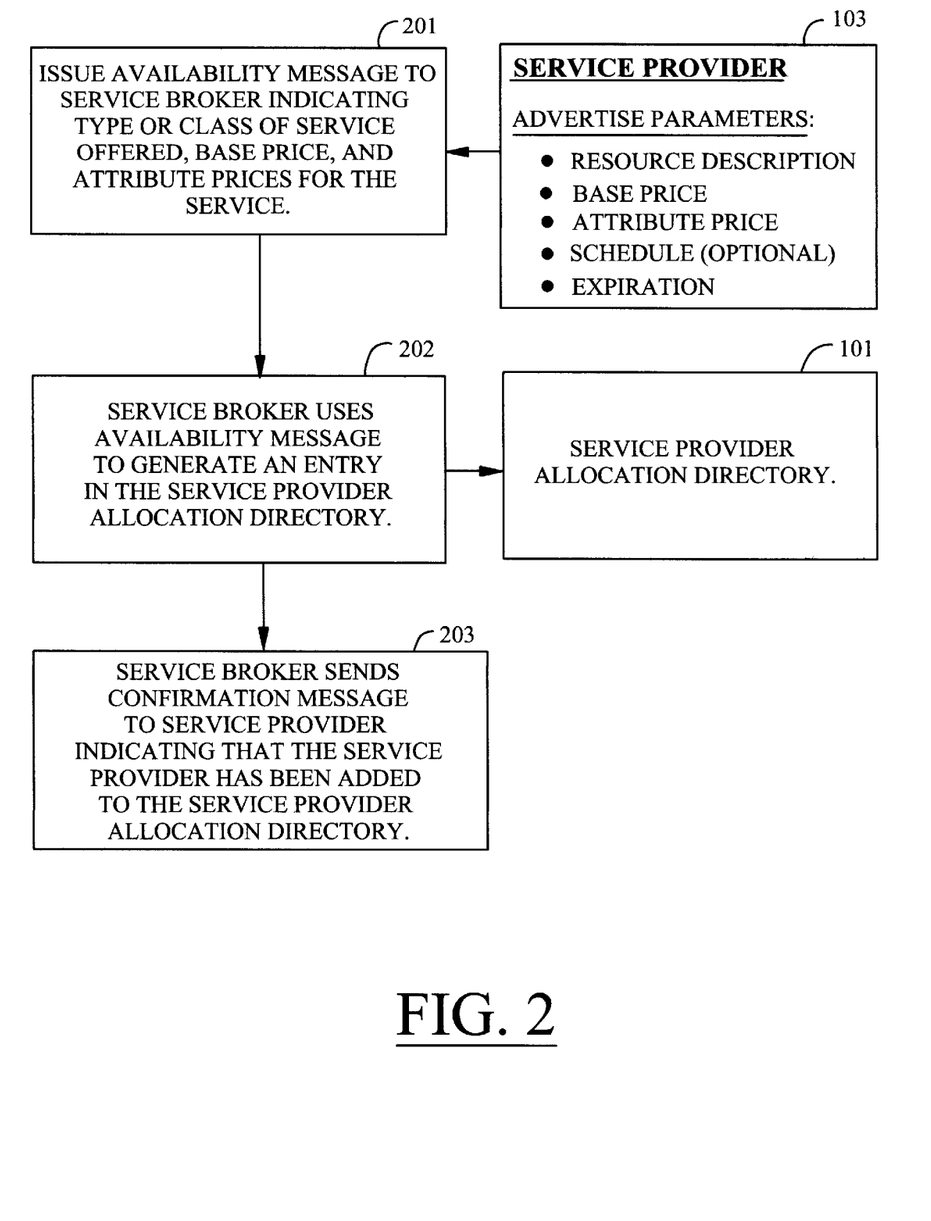
FIG. 2 is a flowchart setting forth an operational sequence to be performed by service providers.

FIG. 2 is a flowchart setting forth an operational sequence to be performed by service providers. The sequence commences at block 201 where the service provider (for instance, first service provider 103 of FIG. 1) sends an availability message to service broker 102 (FIG. 1) indicating the availability of one or more services. These messages identify the type or class of service, the base price, attribute price, schedule and expiration. For example, one type or class of service could be "sending out a fax", another type or class of service could be "printing a document at a color printer", and a third type or class of service could be "stock brokerage services". Still other classes of services could pertain to specific types of stock brokerage services, such as "stock sales transactions", "stock purchase transactions", "stock transactions on the New York Stock Exchange", "biotech stock transactions", "stock transactions involving Motorola Communications", and others. These classes and types of services are merely illustrative of the manner in which service providers may be classified in the context of an actual computer network. It is to be understood that various other methods of classifying service providers, in addition to those specifically enumerated above, are also within the contemplation of the invention.

The operational sequence of FIG. 2 continues at block 202 where service broker 102 (FIG. 1) uses the availability message received at block 201 to generate an entry in the service provider allocation directory 101 (FIG. 1). This entry includes a first indicator identifying the type or class of service provider that issued the availability message, as well as second, third, fourth, fifth, sixth, and seventh indicators. The second indicator specifies the location of the service provider on the computer network. The third indicator specifies the base price for the service. The fourth indicator specifies attribute pricing. The fifth indicator specifies the load premium. The sixth indicator is the reputation premium. The seventh indicator specifying administrative premiums. The third, fourth, fifth, sixth and seventh indicators are later used by the service broker 102 to calculate a levied price for a given service requestor, as will be described in greater detail hereinafter.

Next, the sequence of FIG. 2 optionally advances to block 203 where the service broker sends a confirmation message to the service provider that issued the availability message. The confirmation message informs the service provider that the provider has been added to the allocation directory 101 (FIG. 1).

Figure 3:
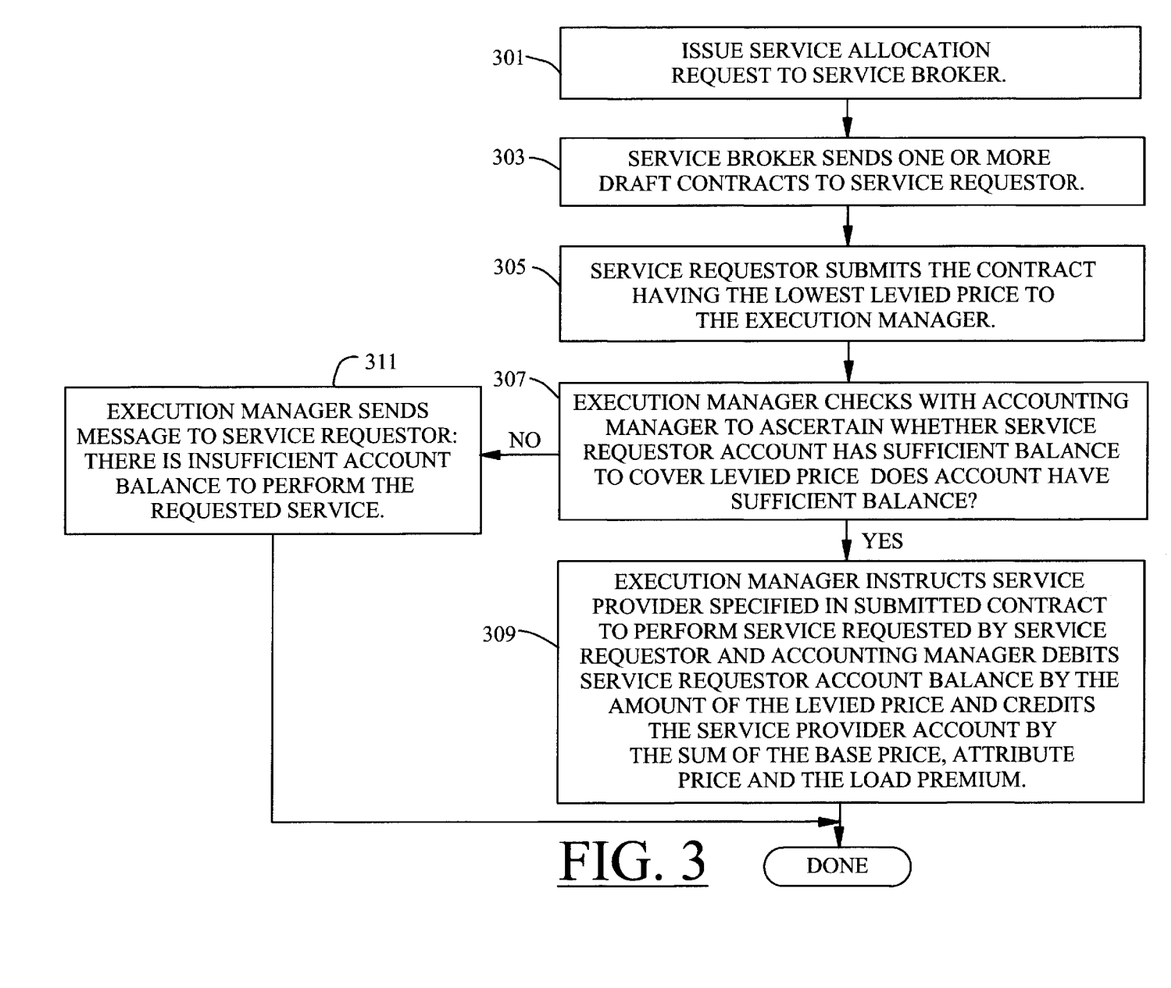
FIG. 3 is a flowchart setting forth an operational sequence to be performed by the system of FIG. 1 upon issuance of a service request by a service requestor.

Refer now to FIG. 3, which is a flowchart setting forth an operational sequence to be performed by the system of FIG. 1 upon issuance of a service request by a service requestor. At block 301, a service requestor, such as first service requestor 108 (FIG. 1), issues a service request to service broker 102 (FIG. 1) over a computer network. The allocation request includes the type or class of service desired, as well as a budget specifying the maximum price that the service requestor will pay for that service. Using a first approach, this maximum price could be pre-programmed by a system administrator. Pursuant to a second approach, an individual using service requestor 108 (FIG. 1) could be given the freedom to select a maximum price. Yet another approach is to provide the individual using service requestor 108 with a menu offering several choices indicative of the relative priority or importance of the request, whereupon this individual selects the appropriate menu option and the service requestor then automatically calculates a maximum price based upon the selected option.

Service requestor 108 (FIG. 1) is equipped with a service requestor account for storing an account balance that will then be used to purchase services from service providers. The maximum price set forth in the allocation request is not allowed to exceed the balance of the service requestor account.

Returning now to FIG. 3, the program continues on to block 303, where the service broker 102 (FIG. 1) sends one or more draft contracts to the service requestor 108 (FIG. 1). The service broker may generate the draft contracts as follows. In response to the receipt of the service request at block 301 (FIG. 3), the service broker uses the first indicators in the allocation directory to generate a trial candidate list of service providers. This trial candidate list only includes service providers of the type or class desired by the service requestor. The service broker then calculates a levied price for each of a plurality of service providers on the trial candidate list. The levied price is the base price in the availability message of a given service provider, plus the attribute price for the attributes or options requested, plus a surcharge based upon the current demand for this service provider, plus a premium based upon the service provider's past performance, plus administrative premiums, plus delivery premiums based on the location of the service provider as related to the service requestor.

The service broker eliminates any service providers on the trial candidate list that do not have a levied price below the budget specified in the service request, thus providing a final candidate list. The service broker then generates a draft contract for each service provider on the final candidate list. The draft contract specifies the identity of the service provider, the location of this service provider on the computer network, the identity of the service requestor, the location of the service requestor on the computer network, the levied price, the base price, the attribute price, the load premium, the reputation premium, the administrative premium, the delivery premium, the type or class of service, an optional schedule for performance of the service, and an optional contract expiration date and time. The service broker sends one or more draft contracts to the service requestor (block 303).

In response to the receipt of one or more draft contracts, the service requestor can redeem any of these draft contracts through the use of an execution manager software component accessible from the computer network. In the example of FIG. 3, the service requestor submits the draft contract having the lowest levied price to the execution manager (block 305). The execution manager then checks with the accounting manager to ascertain whether or not the service requestor account balance is sufficient to cover the levied price (block 307).

If so, the program progresses to block 309 where the execution manager causes the service provider specified in the redeemed contract to perform the service as requested by the service requestor. The accounting manager software component causes the service requestor to pay the levied price specified in the redeemed contract. The payment function is done by debiting a service requestor account for the levied price and crediting the account of the service provider for the base price, attribute price and the load premium. The accounting manager software component, coupled to the computer network, may also be utilized to record executed draft contracts as matches of service requestors to service providers. Another optional feature may be provided by the execution manager. If desired, the execution manager may be equipped to schedule specified services requests in draft contracts to be executed in the future. The negative branch from block 307 leads to block 311, where the execution manager sends a message to the service requestor. "There is insufficient account balance to perform the requested service".

Figure 4:
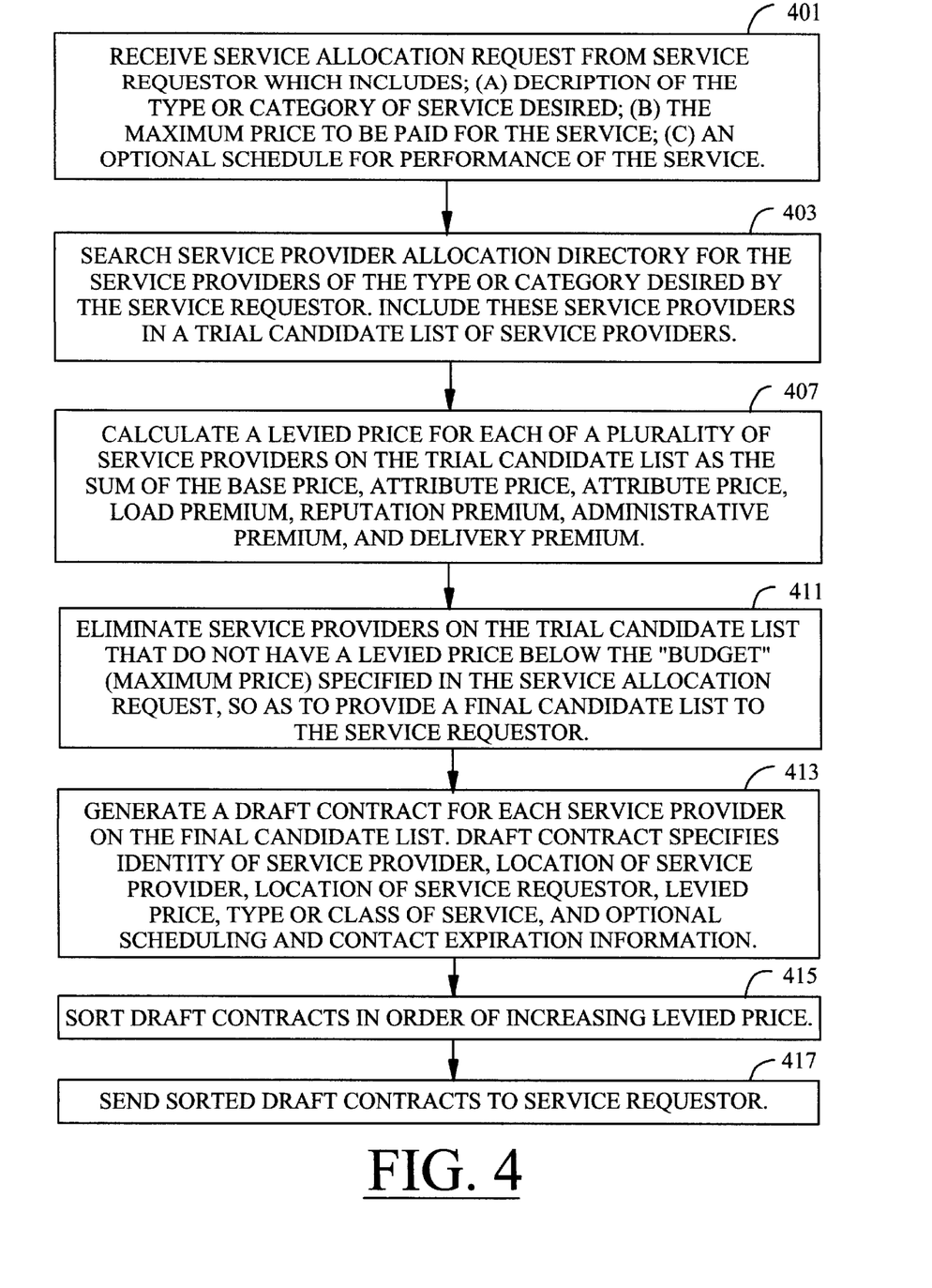
FIG. 4 is a flowchart setting forth an operational sequence to be performed by the service broker upon receipt of a service request from a service requestor.

FIG. 4 is a flowchart setting forth an operational sequence to be performed by the service broker upon receipt of a service request from a service requestor. The sequence of operations commences at block 401 where the service broker (FIG. 1, 102) a service request is received from a service requestor such as first service requestor 108 (FIG. 1). The service request includes (a) a description of the type or category of service desired; (b) the maximum price to be paid for the service; and (c) an optional service schedule for performance of the service. Next, at block 403 (FIG. 4), the service broker searches the service provider allocation directory for service providers of the type or category desired by the service requestor. Service providers meeting this criterion are included in a trial candidate list of service providers.

The program continues to block 407 where a levied price is calculated for each of a plurality of service providers on the trial candidate list. The levied price is calculated as the sum of the base price, the attribute price, the load premium, the reputation premium, administrative premiums and the delivery premium.

From block 407, the program progresses to block 411 where the service broker eliminates any service providers on the trial candidate list that do not have a levied price below the "budget" (maximum price) specified in the service request, so as to provide a final candidate list. The service broker then generates a draft contract for each service provider on the final candidate list (block 413). The draft contract specifies the identity of the service provider, the location of the service provider, the identity of the service requestor, the location of the service requestor, the levied price, the base price, the attribute price, the load premium, the reputation premium, the administrative premium, the delivery premium, the type or class of service, and optional contract expiration and scheduling information. The service broker sorts the draft contracts in order of increasing levied price (block 415), and sends the sorted draft contracts to the service requestor (block 417).

Figure 5:
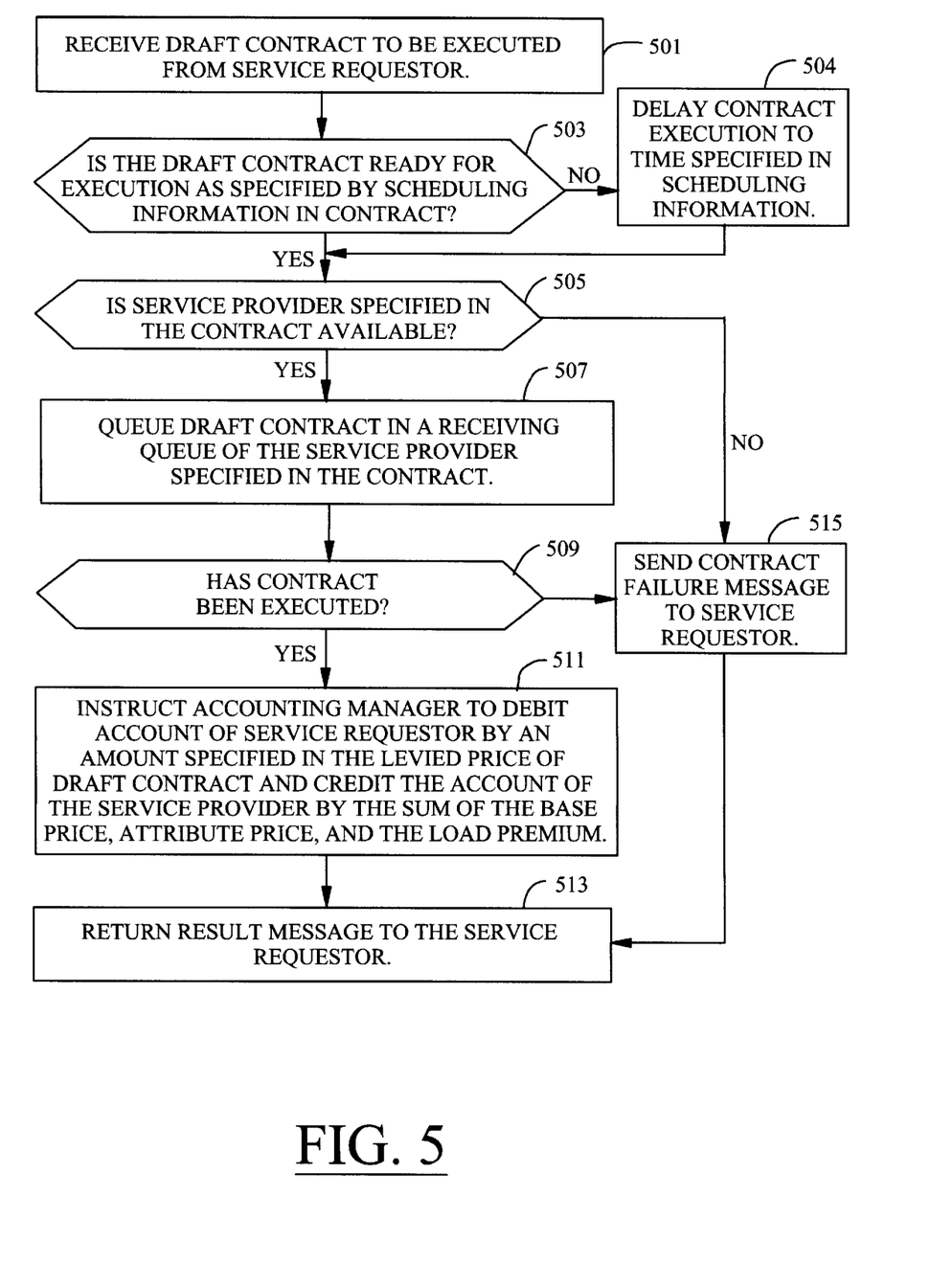
FIG. 5 is a flowchart setting forth an operational sequence to be performed by the execution manager of FIG. 1 upon receipt of a draft contract from a service requestor.

FIG. 5 is a flowchart setting forth an operational sequence to be performed by the execution manager of FIG. 1 upon receipt of a draft contract from a service requestor. At block 501, the execution manager (FIG. 1, 106) receives a draft contract to be executed from the service requestor 108 (FIG. 1). At block 503 (FIG. 5), the execution manager performs a test to ascertain whether or not the draft contract is ready for execution as specified by scheduling information in the contract. If not, the program jumps to block 504 where the contract execution is delayed until the time specified in the scheduling information.

The affirmative branch from block 503 lead to block 505 where the execution manager performs a test to ascertain whether or not the service provider specified in the contract is available. If not, the execution manager sends a contract failure message to the service requestor (block 515). The affirmative branch from block 505 leads to block 507 where the execution manager queues the draft contract in a receiving queue of the service provider specified in the contract.

At block 509, the execution manager performs a test to ascertain whether or not the contract has been executed. If not, the program advances to block 515, described above. If so, the program goes to block 511 where the execution manager instructs the accounting manager to debit the account of the service requestor the amounts of the levied price and credits the service provider the amount of the base price, the attribute price and the load premium specified in the draft contract. The execution manager then sends a result message to the service requestor.

Figure 6:
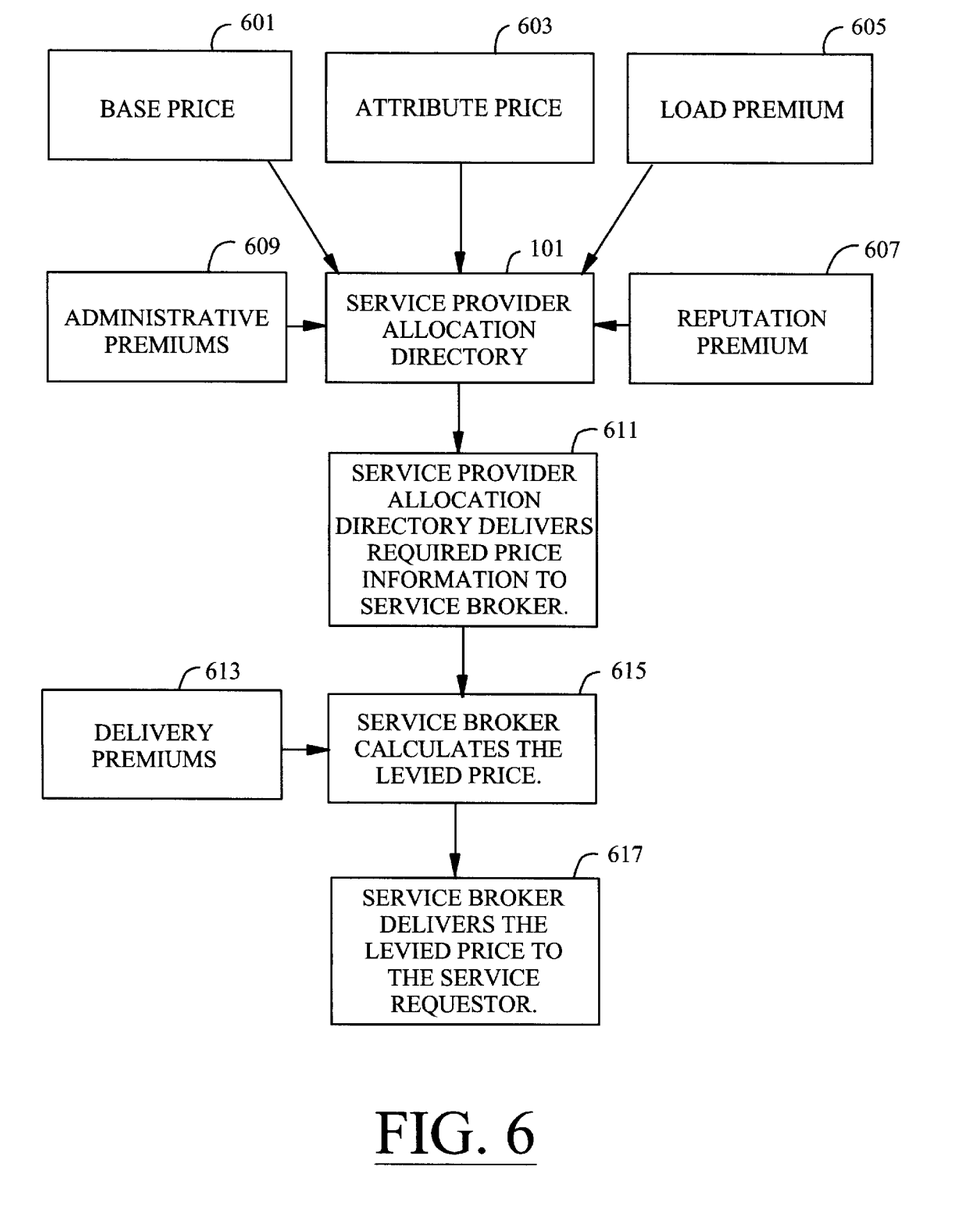
FIG. 6 is a block diagram describing a technique by which the service broker calculates a levied price for a service requestor.

FIG. 6 is a block diagram describing a technique by which the service broker calculates a levied price for a service requestor. This calculation commences by using a base price at block 601 received in the availability message of a service provider (FIG. 1, 103) and stored in the service provider allocation directory 101 (FIG. 1). The service provider may have arrived at this base price at block 601 by considering the underlying cost of the service to be provided. The service provider also sends attribute prices at block 603 in the availability message Attribute prices are also stored in the service provider allocation directory. The attribute prices specify the prices for different levels of service or options that the service provider has available. Only the costs associated to the attributes or options requested by the service requestor will be utilized in the levied price calculation. The execution manager 106 (FIG. 1) maintains a load premium at block 605 that is stored in the service provider allocation directory. The load premium represents an additional cost of using the service to be provided when there is a relatively high demand for that service. The execution manager also maintains a reputation premium at block 607 corresponding to the service to be provided. The reputation premium is also stored in the service provider allocation directory and represents an additional cost of using a service when the reputation of that service is relatively low. The system administrator can also add administrative premiums to the service provider allocation directory at block 609. The administrative premiums are used by the system administrator to influence system usage.

The system delivers the base price, attribute prices, load premiums, reputation premium, and administrative premium information, as represented at block 611, from the service provider allocation directory to the service broker 102.

A delivery premium at block 613 is a charge for the communications requirements to fulfill the service request and is based on the relative locations of the service requestor and the service provider. This charge is represented by a separate service request contract that is entered into by the service broker and a communications service provider.

The levied price is calculated by the service broker at block 615. The levied price is the summation of the base price, attribute price, load premium, reputation premium, administrative premium, and delivery premium. The price is then delivered to the service requestor in the draft contract. This levied price represents the price to be charged to the service requestor 108 upon rendering of the requested service.

We claim:

1. A resource allocation system comprising:
   (a) a plurality of service providers,
   (b) a plurality of service requestors, and
   (c) a service broker,
   wherein the service providers, service requestors, and service broker are all accessible from a computer network, the service broker using a service provider allocation directory to allocate service providers to service requestors based upon dynamically-changing pricing constraints,
   wherein the service provider allocation directory associates each of a plurality of service providers with a first indicator specifying a type or class of service provider, a second indicator specifying the location of the service provider on the computer network, and a third indicator specifying a base price for the service.

2. The system of claim 1 wherein the service provider allocation directory also associates each of a plurality of service providers with at least one of: a fourth indicator specifying attribute pricing, a fifth indicator specifying a load premium, a sixth indicator specifying a reputation premium, and a seventh indicator specifying an administrative premium.

3. The system of claim 1 wherein the prices are updated according to changes in resource usage conditions.

4. The system of claim 1 wherein a relative business priority of a request for a given information resource is expressed as a budget.

5. In a computer network, a method including the steps of:
   (a) allocating a plurality of service providers among a plurality of service requestors according to the relative priorities of processes which request the use of a respective service provider, and
   (b) associating each process with information setting forth the manner in which a service requestor will use that service if it is allocated to that service requestor;
   wherein the plurality of service providers include any of a database, a computer program, a person providing services over a computer network, an information resource, or a hardware resource such as a fax machine, a printer, or a data storage drive;
   wherein the service requestors include any of computer programs and devices accessible from the computer network for use by one or more individuals requesting one or more service providers;
   wherein the service request includes the type or class of service desired, as well as a budget specifying the maximum price that the service requestor will pay for that service;
   further including the step of service providers sending availability messages to the service broker indicating the availability of one or more services, each availability message identifying the type or class of service, location of the service and associating each service with a base price and attribute prices.

6. The method of claim 5 further including the step of the service broker storing the availability messages in a service provider allocation directory.

7. The method of claim 5 wherein, in response to the receipt of a service request, the service broker uses a first indicator in the allocation directory to generate a trial candidate list of service providers, the trial candidate list only including service providers of the type or class desired by the service requestor.

8. The method of claim 7 further including the step of the service broker calculating a levied price for each of a plurality of service providers on the trial candidate list.

9. The method of claim 8 wherein the levied price is the base price.

10. The method of claim 8 wherein the levied price is a summation of the base price and at least one of: an attribute price, a load premium, a reputation premium, an administrative premium, and a delivery premium.

11. The method of claim 10 further including the step of the service broker eliminating any service providers on the trial candidate list that do not have a levied price below the budget specified in the service request, thus providing a final candidate list.

12. The method of claim 11 further including the step of the service broker generating a draft contract for one or more service providers on the final candidate list, the draft contract specifying at least one of: an identity for the service provider, a location of this service provider on a computer network, an identity for a service requestor, a location of the service requestor on the computer network, the levied price, the base price, the attribute price, the load premium, the reputation premium, the administrative premium, the delivery premium, a type or class of service, a schedule for performance of the service, and a contract expiration date and time.

13. The method of claim 12 wherein, in response to the receipt of one or more draft contracts, the service requestor redeems any of these draft contract through the use of an execution manager software component accessible from the computer network.

14. The method of claim 13 wherein the execution manager schedules performance of services specified in draft contracts to be executed.

15. The method of claim 14 wherein the execution manager causes the services provider specified in the redeemed contract to perform the service as requested by the service requestor.

16. The method of claim 15 wherein the execution manager causes the service requestor to pay the levied price specified in the redeemed contract by instructing the accounting manager to debit the service requestor account.

17. The method of claim 15 wherein the execution manager causes the service provider account to be credited for completed service by instructing the accounting manager to credit the service provider account in the amount of the sum of the base price, the attribute price and the load premium.

18. The method of claim 17 wherein an accounting manager software component, coupled to the computer network, records all credits and debits of service requestor and service provider accounts.

19. The method of claim 8 wherein at least one of: a base price component, an attribute price component, a load premium component, a reputation premium component, an administrative premium component, and a delivery premium component of the levied price of each service provider are dynamically adjusted over time in accordance with a series of adjustment rules.

20. The method of claim 19 wherein a first adjustment rule specifies that, as the demand for a particular service provider increases, its load premium also increases.

21. The method of claim 20 wherein a second adjustment rule specifies that the load premium of a service provider that is idle for too long will be decreased until sufficient demand for the resource is generated.

22. The method of claim 21 wherein a third adjustment rule specifies that a given service provider generates sufficient demand or be removed from the allocation directory.

23. The method of claim 22 wherein a fourth adjustment rule specifies that, as a service provider's costs increase, its base price also increases.

24. The method of claim 23 wherein a fifth adjustment rule specifies that, as a service provider's level of service or prioritization changes, its attribute prices also change.

25. The method of claim 24 wherein a sixth adjustment rule specifies that as a service provider's performance changes the service provider's reputation premium also changes.

26. The method of claim 25 wherein, as the service provider's failure rate increases, its reputation premium also increases.

27. The method of claim 26 wherein a seventh adjustment rule specifies that a system administrator can influence the use of a service provider by applying an administrative premium to the service provider allocation directory.

28. The method of claim 27 wherein an eighth adjustment rule specifies that the service broker will determine the delivery premium at the time of creating the draft contract.

29. The method of claim 28 wherein a service broker will issue a service request for delivery based on a location of the service provider and a location of the service requestor.

30. The method of claim 19 further including the step of applying strategic load balancing rules to each service provider to dynamically replicate service providers that cannot handle all of the current demand from service requestors.

31. The method of claim 30 wherein the adjustment rules, as well as any rules used to determine levied prices, utilize information that is locally available on the computer network, thereby producing a globally adaptive, self-configurable behavior for a plurality of service providers.

* * * * *